March 19, 1929.  H. WHITE, JR  1,706,269
AUTOMOBILE SIGNAL
Filed May 26, 1927
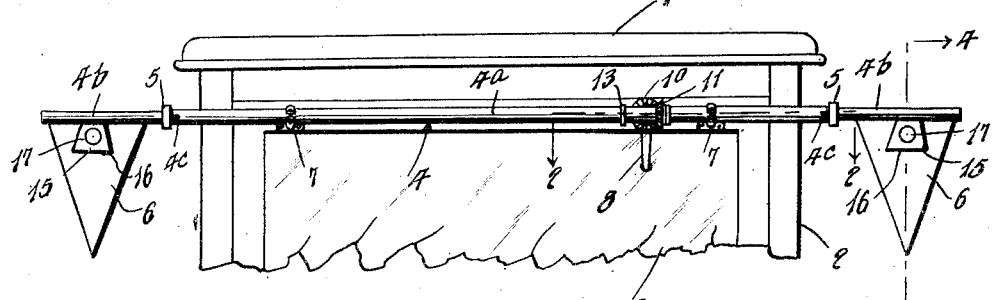
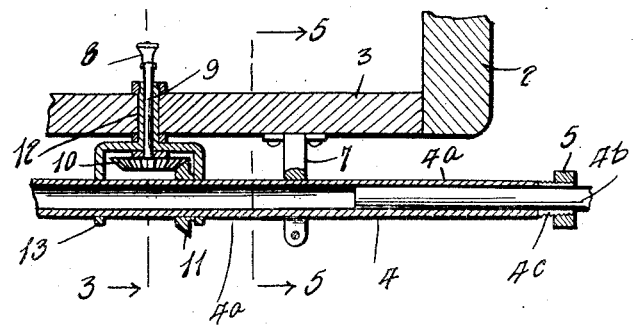
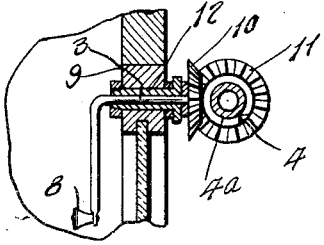
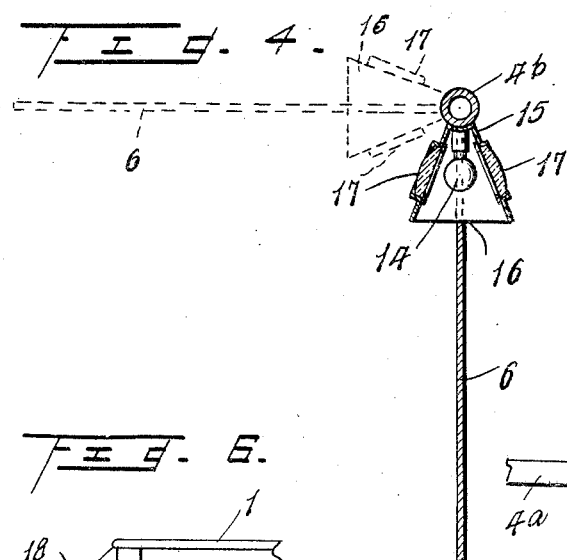
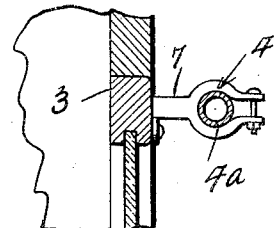
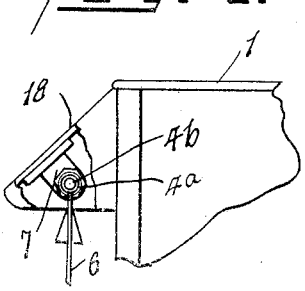
Inventor
H. White Jr.
By
Attorney Patented Mar. 19, 1929.

1,706,269

UNITED STATES PATENT OFFICE.

HENRY WHITE, JR., OF BUFFALO, NEW YORK, ASSIGNOR OF ONE-HALF TO HENRY WHITE, SR., OF BUFFALO, NEW YORK.

AUTOMOBILE SIGNAL.

Application filed May 26, 1927. Serial No. 194,388.

This invention relates to automobile signals, and has for one of its objects to provide a novel, simple and inexpensive device of this character through the medium of which the driver of an automobile may readily indicate that he is about to turn or stop.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is a view in front elevation illustrating the application of the signal to an automobile, Figure 2 is a horizontal sectional view taken on the plane indicated by the line 2—2 of Figure 1, Figure 3 is a vertical sectional view taken on the plane indicated by the line 3—3 of Figure 2, Figure 4 is a vertical sectional view taken on the plane indicated by the line 4—4 of Figure 1, Figure 5 is a similar view taken on the plane indicated by the line 5—5 of Figure 2, Figure 6 is a sectional view illustrating the manner in which the signal may be supported from the vizor of the automobile, and Figure 7 is a detail view illustrating a slight modification of the signal.

Referring in detail to the drawing, 1 designates the top, 2 the front pillars, and 3 the windshield of an automobile of the closed body type. While the signal is illustrated as applied to an automobile of this type, it is to be understood that it is also adapted to be used on automobiles of the open body or touring type and on automobile trucks and the like.

The signal comprises a hollow shaft 4 which is supported in a horizontal position at the front of the automobile and in close proximity to the top 1 thereof. The shaft 4 comprises a central section $4^a$ and end sections $4^b$ of which the latter are telescopically associated with the former so as to permit the length of the shaft to be varied in adapting the signal for application to automobiles of different sizes. The shaft section $4^a$ is provided with split ends $4^c$ which taper in an outward direction and are externally screw threaded and upon which are mounted tapered nuts 5. The ends $4^c$ of the shaft section $4^a$ are compressed by the nuts 5 into such frictional contact with the shaft sections $4^b$ as to prevent the shaft sections $4^b$ from having any rotary or endwise movement with respect to the shaft section $4^a$. The shaft sections $4^b$ project laterally beyond the sides of the automobile, and secured thereto are signaling members 6 which are preferably in the form of rigid pennants.

The shaft 4 is rotatably supported by bearing brackets 7 in which the shaft section $4^a$ is mounted and which may be secured to the body of the automobile or to the frame of the windshield 3. The pennants 6 are adapted to occupy a signaling or a non-signaling position, and are adapted to be moved from one of said positions to the other through the medium of a hand crank 8 secured within convenient reach of the driver of the automobile. The crank 8 is secured to a shaft 9 which is connected to the shaft 4 by gears 10 and 11. The gears 10 and 11 are of the bevel type, and the gear 10 is fixed to the shaft 9 and the gear 11 to the shaft section $4^a$. The shaft 9 is journaled in a bearing sleeve 12 which passes through the part to which the bearing brackets 7 are secured and is provided with a forked extension 13 through which the shaft section $4^a$ passes.

When the pennants 6 are in signaling position, they extend vertically downward from the shaft 4, as illustrated in Figures 1 and 4. When the pennants 6 are in non-signaling position, they extend horizontally rearward from the shaft 4, as shown by dotted lines in Figure 4.

Electric lamps 14 of the incandescent type, are employed to illuminate the pennants 6 when the latter are in signaling position. The lamps 14 are carried by casings 15 which are secured to the shaft sections $4^b$ and arranged within openings 16 in the pennants 6. The lamp casings 15 are fully open at their lower end sides, and their front and rear sides are provided with colored lenses 17. The lamps 14 may be supplied with current from the storage battery of the automobile, and any suitable switch mechanism, not shown, may be arranged in the lamp circuits for the purpose of closing the circuits when the pennants are in signaling position and for the purpose of breaking the circuits when the pennants are in non-signaling position.

In practice the pennants 6 normally occupy their non-signaling position, and when they are in this position the lamps 14 are not lit. When the driver wishes to indicate his intention to stop or make a turn, he moves the pennants 6 from their non-signaling to their signaling position through the medium of the crank 8. As soon as the pennants 6 reach their signaling position, the lamps 14 are lit, with the result that the pennants and the lenses 17 will be illuminated. As the pennants 6 are arranged laterally beyond the sides of the automobile, and as they and the lenses 17 are illuminated when in signaling position, they may be seen from the front, rear or either side of the automobile.

The signal may be easily and quickly applied to an automobile, and it may be easily and quickly operated to move the pennants from one of their positions to the other. As the shaft 4 is adjustable as to length, the signal may be applied to automobiles of different sizes. If desired, the crank 8, shaft 9 and gears 10 and 11 may be omitted, and any other suitable means provided for the purpose of moving the pennants 6 from one of their positions to the other. The signal may be supported from the vizor 18 of the automobile as shown in Figure 6. Only one of the pennants 6 may be used, and when this modification is resorted to the pennant is arranged at the left side of the automobile. The shaft sections 4ª may have their outer portions offset, as shown in Figure 7, so that the pennants will, when in non-signaling position, clear the doors of closed automobiles and occupy a position close to and parallel with the tops of the automobiles.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. An automobile signal comprising a shaft, means for rotatably supporting the shaft in a horizontal position and relatively high in elevation on the automobile with its ends projecting laterally beyond the automobile, signaling members fixed to the projecting ends of the shaft, the signaling members being arranged at right angles to the axis of the shaft and adapted to occupy a substantially vertical signaling position and a substantially horizontal non-signaling position, casings carried by the shaft and extending through the signaling members, the lower sides of the casings being opened, lenses carried by the front and rear sides of the casings, lamps arranged within the casings for illuminating the signaling members and the lenses when said members are in signaling position, and means for turning the shaft so as to move the signaling members from one position to the other.

2. An automobile signal comprising a shaft, means for rotatably supporting the shaft in a horizontal position and at a relatively high elevation on the automobile with one of its ends projecting laterally beyond the automobile, a signaling member fixed to the projecting end of the shaft, the signaling member being arranged at right angles to the axis of the shaft and adapted to occupy a substantially vertical signaling position and a substantially horizontal non-signaling position, a casing carried by the shaft and extending through the signaling member, the lower side of the casing being opened, lenses carried by the front and rear sides of the casing, a lamp within the casing for illuminating the signaling member and the lenses when the member is in signaling position, and means for turning the shaft so as to move the signaling member from one position to the other.

In testimony whereof I affix my signature.

HENRY WHITE, Jr.